B. BAKEWELL, Jr.
Glass-Mold.
No. 159,062.
Patented Jan. 26, 1875.
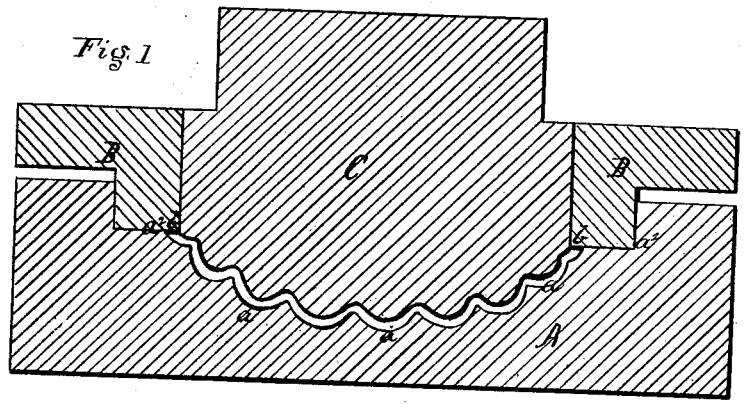
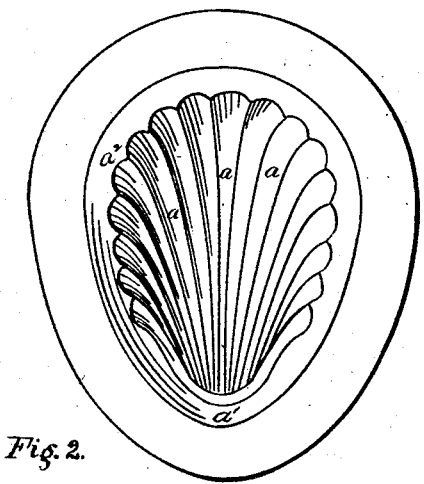
Fig. 2.
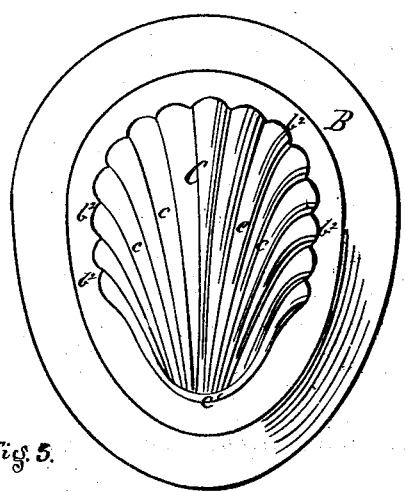
Fig. 5.
Witnesses
James D. Kay
Walter S. Reese
Inventor
Benjamin Bakewell Jr.
by Bakewell & Kerr
Attys.

UNITED STATES PATENT OFFICE.

BENJAMIN BAKEWELL, JR., OF PITTSBURG, PENNSYLVANIA.

IMPROVEMENT IN GLASS-MOLDS.

Specification forming part of Letters Patent No. 159,062, dated January 26, 1875; application filed November 30, 1874.

*To all whom it may concern:*

Be it known that I, BENJAMIN BAKEWELL, Jr., of Pittsburg, in the county of Allegheny and State of Pennsylvania, have invented a new and useful Improvement in Molds and Plungers for Making Glassware; and I do hereby declare the following to be a full, clear, and exact description thereof, reference being had to the accompanying drawing, forming a part of this specification, in which—

Figure 1 is a vertical transverse section of a mold, ring, and plunger. Fig. 2 is a plan view of the mold, and Fig. 3 is a view of the ring and face of the plunger.

Like letters refer to like parts wherever they occur.

My invention relates to the manner of forming molds for the production of pressed glass articles of fluted or corrugated patterns; and it consists in forming the faces of the mold and plunger so that the convexities of one shall coincide with the concavities of the other, whereby uniformity of outline is obtained in the article produced, and the brilliancy of the pattern is increased, owing to the refraction of the light.

In illustrating my invention I have selected from the various shapes to which the invention is applicable a pattern of the shell form, and the molds and plungers shown in the drawing, and which I shall now proceed to describe, are conformed thereto.

A represents the mold, having a concave face formed of the flutes or corrugations $a\ a$, converging to the point $a^1$, the flutes terminating evenly on a line corresponding to the plane of the recess $a^2$, said recess forming the seat of the ring B. In the present instance, the seat $a^2$ is slightly inclined, as is also the under face of ring B, to preserve the outline of the shell. B is the ring, which fits within the recess or seat $a^2$ of the mold, and is made to project slightly beyond the concavity of the mold, as shown at $b$, so as to limit the molten glass and preserve the horizontal scalloped edge of the pattern. C indicates the plunger, having a convex face formed of flutes $c\ c$, converging to the point $c'$. This plunger is the reverse of the mold, having the same number and arrangement of convexities that the mold has of concavities, so that the one shall fit within the other, due allowance being made for the requisite thickness of the article to be formed, but, in other respects, the parts being formed to coincide. The ring B will of course be provided with vertical scallops or recesses, as seen at $b^2$, Fig. 3, to accommodate the corrugated edges of the plunger, and will, in other respects, correspond to the form of the plunger used, all of which is within the knowledge of the skilled mold-maker.

In forming an article of pressed glass in molds similar to those described, the glass will be cut into the mold in the usual manner, and, the ring being in position, the descent of the plunger will force the glass into all the concavities of the mold, while the convexities of the plunger, coinciding with the concavities of the mold, will flute the glass, so as to give uniformity of outline, and increase the brilliancy of the pattern from the refraction consequent upon the form given.

Where the ring projects beyond the concavities of the mold, as shown in the drawing, the article formed will have a horizontal scalloped edge, which adds greatly to its appearance and finish.

Having thus described my invention, so that a mold-maker skilled in the art can apply the same in the production of molds for articles of glassware, what I claim, and desire to secure by Letters Patent, is—

1. The mold and plunger having corrugated faces $a\ c$, formed so that the convexities of one shall coincide with the concavities of the other, substantially as specified.

2. In combination with the mold and plunger having corrugated faces $a\ c$, a ring, B, projecting slightly beyond the edge of the concavity of the mold, and having scallops $b^2$ to accommodate the plunger, substantially as and for the purpose specified.

In testimony whereof I, the said BENJAMIN BAKEWELL, Jr., have hereunto set my hand.

BENJAMIN BAKEWELL, JR.

Witnesses:
F. W. RITTER, Jr.,
T. B. KERR.